Figure 1:
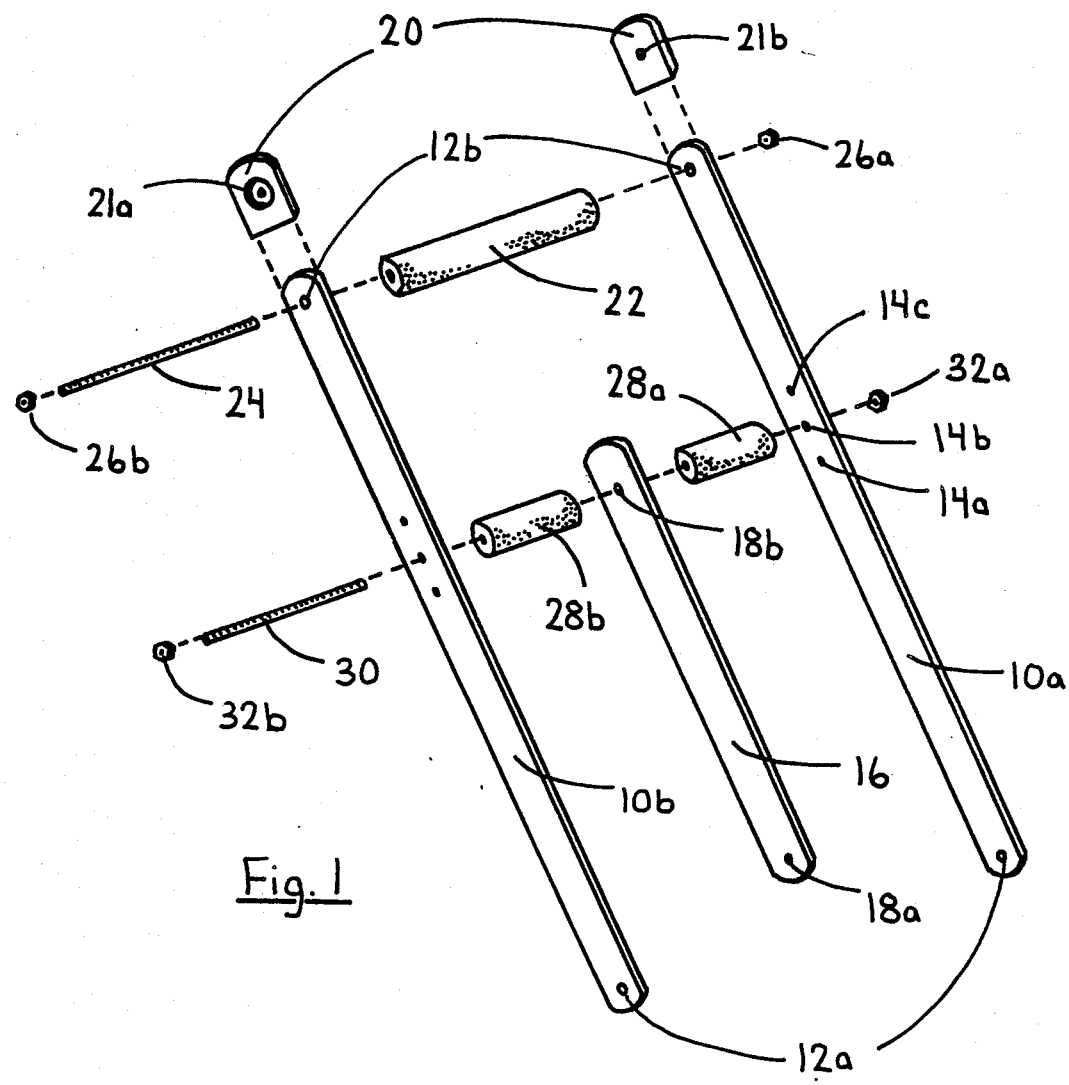

United States Patent [19]

Weisbrodt et al.

[11] Patent Number: 4,903,975

[45] Date of Patent: Feb. 27, 1990

[54] REAR BICYCLE ATTACHMENT HANDLE

[75] Inventors: Diane B. Weisbrodt; Richard G. Weisbrodt, both of Raleigh, N.C.

[73] Assignee: R&D Ventures, Inc., Raleigh, N.C.

[21] Appl. No.: 255,961

[22] Filed: Oct. 11, 1988

[51] Int. Cl.⁴ .............................................. B62H 7/00
[52] U.S. Cl. .................................................... 280/93
[58] Field of Search ................ 280/288.4, 293, 290, 280/7.1, 7.17, 23.1, 47.371, 33.992, 655.1; 180/19.1

[56] References Cited

U.S. PATENT DOCUMENTS

| | | | |
|---|---|---|---|
| 1,449,255 | 3/1923 | Abrahams et al. | 280/7.1 |
| 2,816,775 | 12/1957 | Costello | 280/289 |
| 3,129,772 | 4/1964 | Anderson | 180/19 X |
| 3,336,048 | 8/1967 | Papucki | 280/289 |
| 3,485,507 | 12/1969 | Christof | 280/293 X |
| 3,791,116 | 2/1974 | Wykhuis | 56/255 |
| 4,248,441 | 2/1981 | Joseph | 280/47.34 X |

Primary Examiner—John A. Pekar

[57] ABSTRACT

A rear bicycle attachment handle mechanism used on a small child's bicycle providing a safety feature for the inexperienced rider by allowing a supervising adult to have partial control over an unsteady bicycle, and also providing a supervising adult with the means to propell the bicycle forward without having to stoop or bend over. Furthermore, the rear bicycle attachment handle serves as an excellent exercise tool to be used by a walking adult and a bicycling child whereby the adult can assist the child in propelling the bicycle forward when the child is tired or needs assistance in ascending hills.

The handle section of the invention is comprised of two vertical elongated attachment members (10a and 10b), a hard rubber-like handle (22) positioned horizontally between the upper portions of the attachment members, and a handle bolt (24) securely connecting this section together. The support section is comprised of a vertical support member (16) positioned between the lower sections of the two attachment members, two hard rubber-like spacer bars (28a and 28b) placed horizontally and adjacent to the upper-most portion of the support member, and a support bolt (30) connecting this support section together. The support section is securely bolted onto the attachment handle section through one of three sets of adjustment holes (14a, 14b or 14c), located along the central portion of the attachment members, providing the user of the invention with variations in handle heights which correspond with different user and bicycle heights. Once the entire unit is assembled, the lower ends of the attachment members are bolted onto the existing rear wheel axle of a bicycle and the lower end of the support member is attached to the existing seat adjustment bolt of the bicycle.

9 Claims, 2 Drawing Sheets

REAR BICYCLE ATTACHMENT HANDLE

BACKGROUND

1. Field of Invention

This invention relates to bicycles, specifically to the size(s) bearing training wheels most commonly utilized by children between the ages of 3 and 5, for use whereby a supervising adult, (the "user"), can use the rear bicycle attachment handle to guide, steady, and/or propell an inexperienced or tired rider.

2. Description of Prior Art

Many, if not all, mothers of preschool age children look forward to the time when their child learns to ride a bicycle. It is too bad though, that this time is usually filled with toppled over bicycles, scrapped knees and bandaged elbows. If only there was a way for an adult to keep the child upright and steady without having to bend over and hurt one's back while holding onto the bicycle's seat.

Heretofore, bicycle attachment handles have not received enough attention. For the most part though, they have only been designed for use on tricycles instead of small bicycles.

One such attachment handle in patent 3,336,048 to Zdzislaw Papucki, 1965 June 8, consisted of a vertical extension rod having a 90 degree bend at the top where the handle grip was attached. The entire unit was to be mounted on the central section of the tricycle's handlebar allowing an adult to actually steer the tricycle. This design partially obstructed the view of the rider resulting in a safety hazard.

Another type of attachment handle in patent 2,816,775 to James P. Costello, 1955 Feb. 16, consisted of a large horseshoe shaped unit having a handle at the rear of the horseshoe. The open ends of the horseshoe were to be inserted into the end section of the tricycle's hand grips. The shape of the unit allowed the rider to be seated within the horseshoe. This design provided an adult with the means to propell and also steer the tricycle from behind. It had several drawbacks though. The unit itself was very large and cumbersome. Also, since it lacked any support means, the entire unit had to be detached from the tricycle each time it was put to use.

Most users, therefore, would find it beneficial to have a light weight and durable attachment handle which would be securely attached to the rear wheel section of a child's bicycle.

OBJECTS AND ADVANTAGES

Accordingly, we conclude the following as our objects and advantages: to provide a light weight, durable rear attachment handle for a small bicycle, which provides the means by which the user can have partial control over the steadiness and direction of the child's bicycle, to provide an attachment handle which allows the user to assist a child in propelling the bicycle forward, to provide an attachment handle of a height tall enough to eliminate back strain produced when bending over to push a tired rider, to provide a means by which the inexperienced rider would have more of a secure feeling when attempting to master bicycle riding, and to provide a safer means of recreation for young riders.

In addition, we conclude the following additional objects and advantages: to provide a means by which the user and a child can jointly enjoy an exercise routine whereby the user can take a brisk walk outdoors while the child pedals his bicycle at the same pace as the user's stride. When the child eventually tires, the user can continue their pace simply by gripping the rear bicycle attachment handle and pushing the child on the bicycle until the child has rested long enough to continue the outing on his own.

Further objects and advantages of our invention will become apparent from a consideration of the ensuing description and the accompanying drawings.

DRAWING FIGURES & REFERENCE NUMERALS

Figure 2:
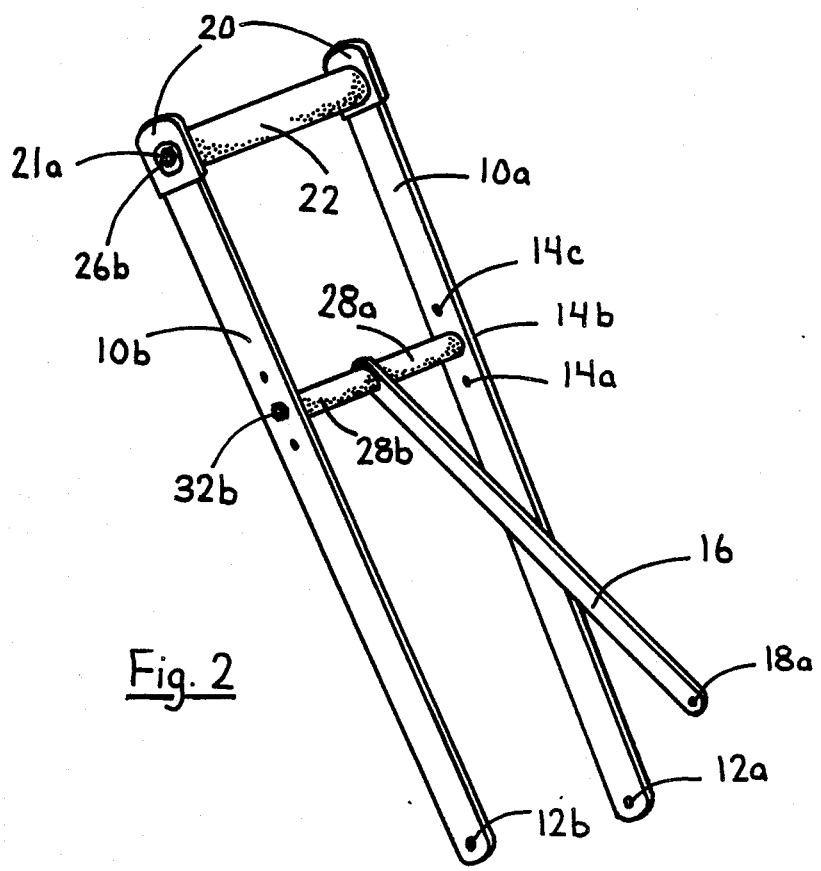

FIG. 1 shows an exploded view of our invention.
FIG. 2 shows a perspective view of our invention.
10a right attachment member
10b left attachment member
12a lower hole of 10a and 10b
12b upper hole of 10a and 10b
14a lower adjustment hole of 10a and 10b
14b middle adjustment hole of 10a and 10b
14c upper adjustment hole of 10a and 10b
16 support member
18a lower hole of 16
18b upper hole of 16
20 protector caps
21a outer hole of 20
21b inner hole of 20
22 handle
24 handle bolt
26a right locking nut for 24
26b left locking nut for 24
28a right spacer bar
28b left spacer bar
30 support bolt
32a right nut for 30
32b left nut for 30

DESCRIPTION OF INVENTION

FIG. 1 shows each individual piece of our invention with the entire constructed unit being shown in FIG. 2.

The handle section of our invention is comprised of two elongated attachment members 10a and 10b, approximately 40-inches in length and preferrably made of strong, lightweight metal. Attachment members 10a and 10b have a thickness great enough to prevent attachment members 10a and 10b from bending. Attachment members 10a and 10b have a lower hole 12a for mounting the invention to the existing rear wheel axle section of a bicycle by removing the existing nuts, sliding holes 12a over the existing rear wheel axle bolt, then resecuring the nuts onto the axle bolt. Attachment members 10a and 10b also have an upper hole 12b for inserting handle bolt 24 through.

Handle bolt 24 is approximately 11-inches in length and preferrably made of a circular, threaded metal bar approximately ⅜-inch in diameter. Handle bolt 24 is inserted through cushioned handle 22. Handle 22 is tubular in shape and is preferrably made of a polymeric material. Cushioned handle 22 is approximately 1-inch shorter in length than handle bolt 24 having the outer diameter being about 1-inch with the inner opening being slightly larger than the diameter of handle bolt 24. Cushioned handle 22 has variations in color.

Before joining the handle components to attachment members 10a and 10b, the protector caps 20 need to be properly positioned over the top portion of attachment members 10a and 10b. Protector caps 20 are to be made of a polymeric material to prevent metal attachment members 10a and 10b from scratching, denting, or harming other objects. Protector caps 20 are molded to snugly fit over and around the top portion of attachment members 10a and 10b. Protector caps 20 have two holes 21a and 21b which, when positioned over the top section of attachment members 10a and 10b, correspond with upper holes 12b of attachment members 10a and 10b.

Once protector caps 20 are in place, the handle components are positioned between attachment members 10a and 10b. The protruding ends of handle bolt 24 are inserted through protector cap holes 20a and 20b, and through upper holes 12b located on the uppermost section of attachment members 10a and 10b. Locking nuts 26a and 26b are then threaded onto handle bolt 24 tightly securing the handle section onto attachment members 10a and 10b.

The supporting section is comprised of support member 16, which has an approximate length of 24-inches and is made of the same strong, light-weight metal as attachment members 10a and 10b. Support member 16 is placed parallel to and between the lower sections of attachment members 10a and 10b. Support member 16 has a lower hole 18a for mounting support member 16 to the existing seat adjustment bolt section of a bicycle by removing the existing nut, sliding hole 18a over the existing bolt, then resecuring the nut onto the bolt. Support member 16 also has an upper hole 18b for connecting support member 16 to support bolt 30.

Support bolt 30 is approximately 9-inches in length and preferably made of a circular, threaded metal bar approximately ⅜-inches in diameter. Support bolt 30 is inserted through right spacer bar 28a, upper hole 18b of support member 16, and left spacer bar 28b, respectively. Spacer bars 28a and 28b are approximately 4-inches in length and are preferrably made of a polymeric material. Spacer bars 28a and 28b are tubular in shape with the outer diameter being about 1-inch and the inner opening being slightly larger than the width of support bolt 30. Spacer bars 28a and 28b have variations in color.

Once supporting section is assembled, the protruding ends of support bolt 30 are inserted through like adjustment holes 14a, 14b or 14c located in the central section of attachment members 10a and 10b. Adjustment hole 14c is located about 14-inches from the top of attachment members 10a and 10b. Adjustment holes 14b and 14a are located directly beneath adjustment hole 14c, with each of the three holes having an approximate 2-inch spacing between them. Adjustment holes 14a, 14b and 14c have an approximate width slightly larger than that of support bolt 30.

Finally, nuts 32a and 32b are threaded onto support bolt 30, temporarily securing the supporting section onto the handle section.

The individual parts of the invention detailed in FIG. 1 and FIG. 2 perform various functions.

Attachment members 10a and 10b serve as the bracing apparatus for the entire rear bicycle attachment handle mechanism and also bear the most pressure when put to use. Lower hole 12a, located near the lower ends of attachment members 10a and 10b, provide the means by which attachment members 10a and 10b are attached to the existing rear wheel axle section of a bicycle. Upper hole 12b, located near the upper ends of attachment members 10a and 10b provide the means by which cushioned handle 22 is permanently bolted between attachment members 10a and 10b. Furthermore, adjustment holes 14a, 14b, and 14c, located along the central portion of attachment members 10a and 10b, provide for variations in the angular positions of the handle section.

Protector caps 20, when positioned over the upper edges of attachment members 10a and 10b, prevent the scratching, denting, or damaging of objects such as cars, boats, and/or children.

Cushioned handle 22 serves as the spacer bar between attachment members 10a and 10b and also provides for a soft, comfortable grip when the user places his hands upon it. With the use of handle bolt 24 and locking nuts 26a and 26b, cushioned handle 22 is permanently bolted through upper holes 12b creating the handle section of the invention.

Support member 16 serves as the supporting apparatus for the handle section mentioned above. Lower hole 18a, located near the lower end of support member 16, provides the means by which support member 16 is attached to the existing seat adjustment bolt of a bicycle. Upper hole 18b, located near the upper end of support member 16, is where support bolt 30 is inserted. At right angles and adjacent to upper hole 18b are spacer bars 28a and 28b which provide for equal spacing on either side of support member 16 allowing for the even placement of support member 16 between attachment members 10a and 10b. Running horizontally through spacer bar 28a, support member 16, and spacer bar 28b, respectively, support bolt 30 is then inserted through attachment members 10a and 10b at a matched pair of adjustment holes 14a, 14b, or 14c. Removable nuts 32a and 32b temporarily secure support bolt 30 between attachment members 10a and 10b. Furthermore, removable nuts 32a and 32b allow support bolt 30 to be easily transfered to a different pair of adjustment holes providing for variations in the handle section's angular positions. The insertion of support bolt 30 into the various adjustment hole sets have the following results: lower adjustment holes 14a position the handle section at it's lowest angle, upper adjustment holes 14c position the handle section at it's highest angle, and middle adjustment holes 14b position handle section at an angle midway between the other two angles. This support section secures the handle section in place by preventing the handle section from falling to the ground or sliding toward the rider.

Users will find the invention of FIG. 1 and FIG. 2 advantageous since it provides for a light-weight, yet durable rear bicycle attachment handle mechanism which broadens the range of uses for a tried and true method of recreation, the bicycle. Learning to ride a bicycle will become safer and more enjoyable for youngsters and adults alike. Furthermore, a walking adult coupled with a bicycling youngster provides for a very enjoyable and excellent means of exercise for both participants.

While the above descriptions and accompanying drawings may contain many specifications, the reader should not interpret these as limitations on the scope of the invention. The overall concept of the invention may remain the same, even though the dimensions and shapes of the various pieces can readily be altered. For example, the size, shape and composition of the attachment members and the support member could be lengthened, made tubular in shape, chrome plated, and/or manufactured out of a strong durable plastic compound. There may also be a variations to the color schemes. Hence, the reader is asked not to limit the scope of the invention by the descriptions stated above or by the accompanying drawings, but to determine it's scope by the appended claims and their legal equivalents.

We claim:

1. A rear bicycle attachment handle mechanism for a child's bicycle comprising:

two elongated attachment members of equal length each having an upper hole located near one end of said attachment members and a lower hole located near the opposite end of said attachment members, a plurality of adjustment holes located near the central portion of said attachment members, and a protector cap covering the upper-most ends of said attachment members preventing said attachment members from damaging other objects, means for joining said attachment members at said upper holes whereby a cushioned handle is permanently bolted between and at right angles to said attachment members with an elongated handle bolt and two locking nuts, means for joining said attachment members at said adjustment holes with a centrally located support section, said support section having one elongated support member having an upper hole located near one end of said support member and a lower hole located near the opposite end of said support member, two cushioned spacer bars positioned adjacent and at right angles to said upper hole of said support member, and an elongated support bolt horizontally inserted through said spacer bars and said support member, said support section then being positioned between said attachment members allowing said support bolt to be inserted through one matched pair of said adjustment holes where two removable nuts temporarily fasten said support section to said attachment members, said removable nuts furthermore allowing said support section to be easily removed from one pair of said adjustment holes and re-inserted through another pair of said adjustment holes providing variations in the invention's angular positions, and means to secure said rear bicycle attachment handle mechanism through said lower holes of said attachment members and through lower hole of said support member to the rear portion of a child's bicycle providing a walking person with the means to propell said bicycle forward without interfering with or limiting the independent use of said bicycle.

2. The invention of claim 1 wherein said attachment members are made of a strong, durable, lightweight metal compound.

3. The invention of claim 1 wherein said protector caps are molded to tightly fit over the upper-most portion of said attachment members having two holes which correspond with said upper holes of said attachment members.

4. The invention of claim 3 wherein said protector caps are made of polymeric material.

5. The invention of claim 1 wherein said cushioned handle is tubular in shape.

6. The invention of claim 5 wherein said cushioned handle is made of polymeric material.

7. The invention of claim 1 wherein said support member is made of strong, durable, lightweight metal compound.

8. The invention of claim 1 wherein said spacer bars are tubular in shape.

9. The invention of claim 8 wherein said spacer bars are made of polymeric material.

* * * * *